June 25, 1968  A. WINTER  3,389,672

VEHICLES

Filed Aug. 1, 1966  2 Sheets-Sheet 1

United States Patent Office 3,389,672
Patented June 25, 1968

3,389,672
VEHICLES
Anthony Winter, Seaview, Isle of Wight, England, assignor to Westland Aircraft Limited, Yeovil, Somerset, England
Filed Aug. 1, 1966, Ser. No. 569,244
Claims priority, application Great Britain, Sept. 24, 1965, 40,885/65
10 Claims. (Cl. 114—67)

ABSTRACT OF THE DISCLOSURE

A vehicle capable of operating as a gaseous cushion borne craft, or in an alternative mode as a displacement vessel, the vehicle having retractable and extendable structure which supports skirting in order to contain the gaseous cushion and provide an increased cushion area relative to the hull planform area. The structure and skirting, when extended, provide means for delivering gas from the ducts in the hull to the cushion and, when retracted, provide means for sealing the ducts.

---

This invention relates to vehicles which, during one phase of operation, are wholly or partly supported on one or more cushions of gaseous fluid, and which, during another phase of operation, act as a displacement water craft. It is with laterally extending, retractable structures having a flexible skirting assembly depending therefrom, for such vehicles, that this invention is more particularly concerned.

By flexible skirting assembly, I mean flexible components of material substantially impermeable to fluid which, when the vehicle is wholly or partly supported on a cushion or cushions of gaseous fluid, depend below its rigid structure. The components act as at least part of a barrier to the dissipation of the gaseous fluid cushion or cushions, and may also act as part of a duct through which pressurised fluid may be fed, in order to generate and/or maintain the cushion or cushions of gaseous fluid.

It is an object of the invention to provide a dual purpose vehicle having laterally extending retractable structures which may be folded to conform to the shape of the rigid hull.

According to the prevent invention, I provide a vehicle which, during at least one phase of operation, is wholly or partly supported on at least one cushion of pressurised gaseous fluid, and which, during another phase of operation, acts as a displacement water craft, said vehicle having at least one buoyant hull which includes gaseous fluid supply ducting, said hull having pivotally attached thereto retractable structures which are arranged to move between an extended position and a retractable position, and characterised in that least part of each of said structures, when retracted, obturates said supply ducting to prevent ingress of water into said discharge orifices, and provides an enclosed hull shape, over at least that portion of the hull which contacts the water when the vehicle functions as a displacement water craft.

In another aspect of the invention, I provide a vehicle which, during one phase of operation, is wholly or partly supported on at least one cushion of gaseous fluid, and which, during another phase of operation, acts as a displacement water craft, said vehicle having at least one buoyant hull which includes gaseous fluid supply ducting, said hull having pivotally attached thereto retractable structures which, when in operation, extend the supply ducting, said structures including laterally extending rigid portions, said rigid portions having at least part of a flexible skirting assembly depending therefrom, said skirting assembly being provided with at least one discharge orifice in the lower region thereof, through which pressurised gaseous fluid from said supply ducting issues, in order to create and replenish the cushion or cushions of gaseous fluid, said structures, when not in use, being stowed in a manner so as to prevent the ingress of water into said supply ducting, and together with the hull, to present a practical hull shape over at least that portion of the hull which contacts the water when the vehicle functions as a displacement water craft.

Preferably, the retractable structures supporting the flexible skirting assemblies are provided on those peripheral portions of the vehicle which are substantially parallel to the longitudinal axis of the vehicle. In the case of a vehicle provided with two or more parallel hulls arranged to form a channel or channels extending along the length of the vehicle, any suitable form of retractable flexible skirting assembly may be provided to act as barriers across the bow and the stern of the vehicle, in order to retain the cushion or cushions of gaseous fluid in the channel or channels.

In one embodiment of the invention, the flexible skirting assembly may be constructed essentially of two portions, an upper inflatable portion, and lower segmented portion. The inner edge of the upper portion may be flexibly attached to the hull in proximity to one side of a gaseous fluid supply ducting, and the outer edge of the upper portion flexibly attached to the free extremity of a substantially rigid member, which pivots upon the hull at a point in proximity to the other side of the gaseous fluid supply ducting, and which extends outwardly from the hull. The rigid member is adapted to be swung, about the pivot point, between an operating position and an upwardly stowed position, movement of the rigid member being controllable. Alternatively, both the inner and outer edges of the upper portion may be flexibly attached in the region of the outer extremity of each retractable structure, such that said structure, together with said flexible skirting assemblies, forms a continuation of the gaseous fluid supply ducting, when the vehicle operates as a ground effect vehicle. A part of said structure, when retracted, obturates said supply ducting, in order to prevent the ingress of water into said supply ducts over at least that part of the hull which contacts the water when the vehicle functions as a displacement water craft.

Further objects and advantages of the invention will become more readily apparent from the following detailed description, with reference to the accompanying drawings, which is by way of example, and in which.

Figure 1:
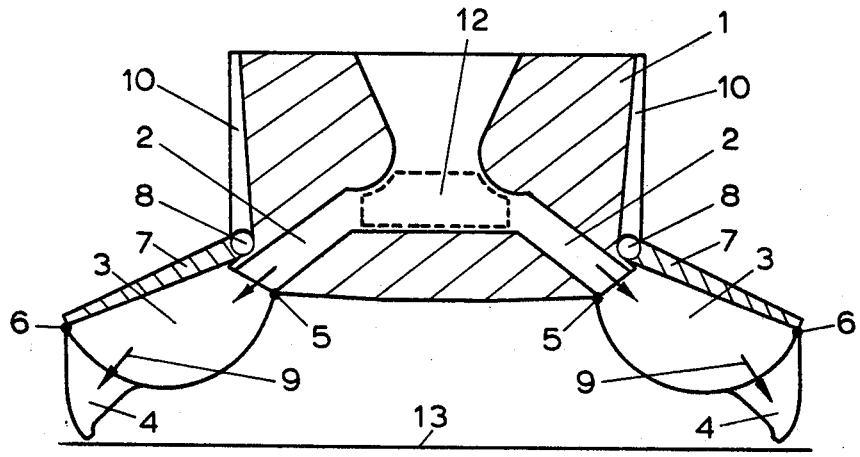
FIGURE 1 is a diagrammatic illustration of a vehicle according to the invention, in the form of a vertical cross-section in the plant parallel to the lateral axis of the vehicle, showing the vehicle in an air cushion supported attitude.
Figure 2:
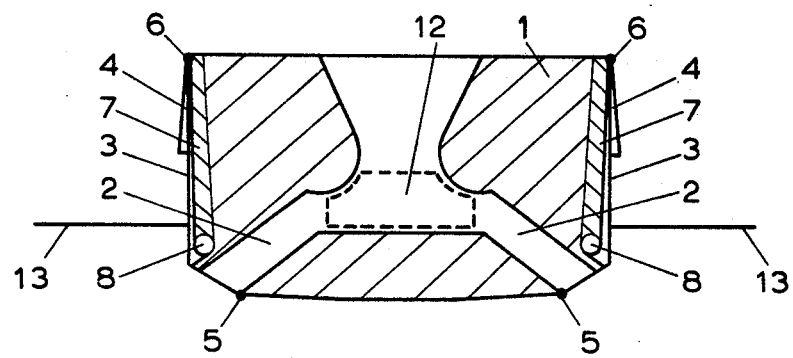
FIGURE 2 shows the vehicle illustrated in FIGURE 1 as a displacement water craft.
Figure 3:
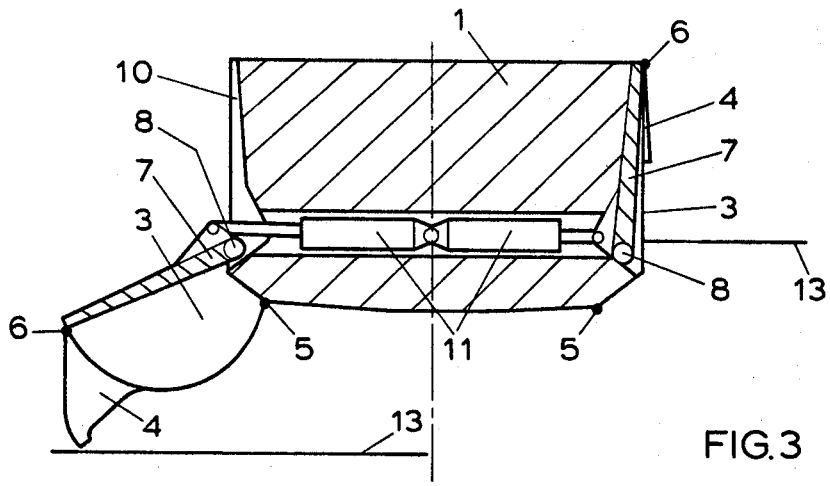

FIGURE 3 is a composite view of the vehicle illustrated in FIGURES 1 and 2, showing a method of operating the retractable structure. The air ducting is omitted for the sake of clarity. The left side of the figure shows the vehicle in the gaseous cushion supported configuration, and the right side shows the vehicle in the displacement configuration.

Figure 4:
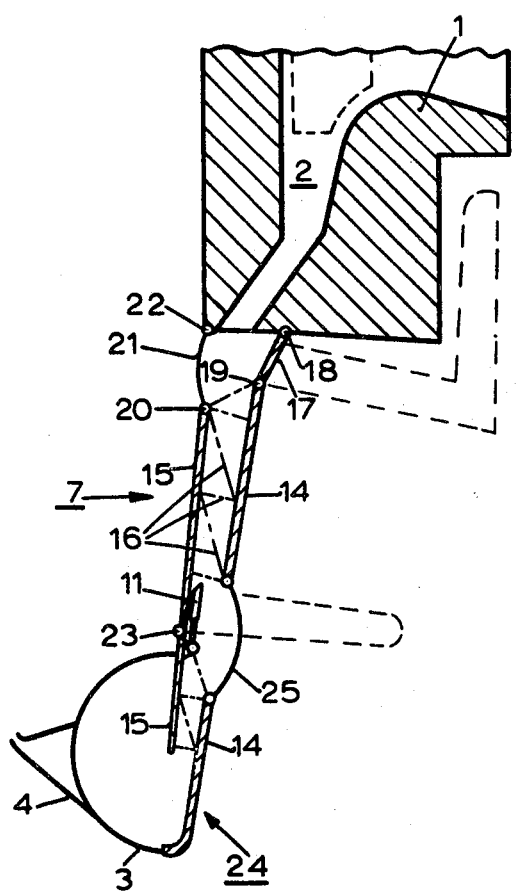

FIGURE 4 shows a portion of a vehicle according to a further embodiment of the invention, wherein the flexible skirting depends from the free extremities of a retractable structure.

In carrying the invention into effect, according to one embodiment, I provide a vehicle having a rigid buoyant hull 1 furnished with gaseous fluid supply ducting 2. A flexible skirting assembly consisting of an upper pressurized part 3, and a lower segmented part 4, is attached at point 5 to the rigid hull 1, adjacent the wall of the gaseous fluid ducting 2, nearest to the air cushion area and to point 6 on the free extremity of the structures indicated by the numeral 7. The structure 7 may be in the form of a plurality of independent pivotal levers spaced along each side of the hull 1, interconnected by flexible fluid impermeable sheets, or may be in the form of one or more rigid platforms. In either form it is attached by pivotal means 8 to the rigid hull on the side of the ducting 2, opposite to the skirt attachment point 5. The upper part 3 of the skirting assembly is provided with orifices 9, which co-operate with the segmented part 4 of the skirting assembly.

Retraction of the skirting assembly is achieved by movement of the structure 7 from a laterally extending position to an upwardly extending stowed position. Recesses 10 are provided in the hull 1 to accommodate the structures 7, when they are in the upward stowed position. Movement of the structure 7 is effected by hydraulic jacks 11 or by other convenient means, for example, mechanical, electrical or pneumatic systems.

In operation, when it is desired that the vehicle be wholly or partly supported by one or more cushions of air above a water surface 13, the structures 7 are lowered, and the flexible skirting assembly fed with air, pressurised by a lift fan 12, via the gaseous fluid supply ducting 2. The air inflates the upper portion 3 of the skirting assembly and issues from the orifices 9, so as to generate and/or maintain the cushion or cushions of air. If desired, the structures 7 may be designed to be held firmly in a fixed position relative to the hull, or it may be designed such that at least a portion may be deflected upwardly, relative to the hull, when the skirting assembly is deflected by an obstacle.

When it is desired that the vehicle operates as a displacement water craft, the air supply to the cushion area is stopped, and the structures 7 are retracted upwardly about their points of attachment to the hull, and stowed in recesses 10 provided in the hull. When the structures 7 are in the stowed position, the flexible sheet forming the upper part of the skirt 3 is extended across the ends of the gaseous fluid ducting 2, and thus seals them against the ingress of water. At the same time, the flexible sheet is extended up the sides of the vehicle to provide a skin for an efficient rigid hull.

In a further embodiment of the invention according to FIGURE 4 of the accompanying drawings, the hull 1 furnished with gaseous fluid supply ducting 2 has pivotally attached thereto structures 7 generally indicated. The structures 7 comprise an upper portion 14 and a lower portion 15 spaced apart from the upper portion 14 by members 16 (shown dotted for clarity). The upper portion 14 of the structures 7 is attached to the hull 1, by means of a link 17. The link 17 is pivoted at 18 and 19, so as to facilitate local folding of the structures 7 when they are retracted. A flexible skirting assembly similar to that shown in FIGURES 1 to 3, having an upper portion 3 and a lower segmented portion 4, depends from the free extremities of the upper and lower portions 14 and 15 of the structures 7. The lower portion 15 of the structure 7 has attached at point 20 a flexible sheet 21, which is connected to the hull 1 at point 22. The flexible sheet 21 closes off the supply ducting 2 in the hull 1, when the structures 7 are retracted.

For convenience, the structure 7 may have hinge means 23, about which the end portion 24 of the structure 7 may be swung, so as to decrease the vertical height when the structure 7 is fully retracted. The means of folding up the end portion 24 of the structure 7 may be by hydraulic jacks 11, or by any other known means, for example, electrical, pneumatic, or mechanical systems. Similarly, the whole structure 7 may be swung upwardly about the hinge points 18 and 19 by hydraulic jacks (not shown in FIGURE 4), or by any other known means, as hereinbefore disclosed. A flexible sheet 25 allows the free extremity to fold easier about the hinge 23.

In operation of the latter embodiment, when the hinged structures 7 are retracted upwardly, a portion of the structure 7, namely the flexible sheet 21, obturates the gaseous fluid supply ducting 2, to prevent the ingress of water into the supply ducting 2, when it is desired to operate the vehicle as a displacement vessel.

The dotted lines in FIG. 4 show the approximate positions of the retracted components.

It is to be further understood that structures 7 may include hollow rigid members which extend the gaseous fluid supply ducting 2. It is also to be understood that, although FIGURE 4 discloses a flexible sheet attached to the hull 1 and to the lower portion 15 of the structure 7, in some cases it may be advantageous to replace the flexible sheet 21 by a blanking member flexibly attached to said hull 1, and to the lower portion 15.

It will be appreciated that many modifications are possible, without departing from the scope of the invention. For example, any suitable form of flexible skirting assembly may be employed, and need not be limited to the specific type described hereinbefore. Also, the general contour of the hull need not be limited to the substantially flat bottomed form, as illustrated in the drawings, providing that the flexible skirting assembly depends below the hull when in use.

I claim as my invention:

1. A vehicle which, during at least one phase of operation, is wholly or partly supported on at least one cushion of gaseous fluid, and which, during another phase of operation, acts as a displacement water craft, said vehicle having at least one buoyant hull which includes gaseous fluid supply ducting, said hull having pivotally attached thereto retractable structures which, when in operation, extend the supply ducting, said structures including laterally extending substantially rigid portions, said substantially rigid portions having depending therefrom at least part of a flexible skirting assembly, said skirting assembly being provided with at least one discharge orifice, through which pressurised gaseous fluid from said supply ducting issues, in order to replenish the cushion or cushions of gaseous fluid, said structures, when not in use, being stowed in a manner so as to prevent the ingress of water into said supply ducting, and, together with the hull, to present a practical hull shape over at least that portion of the hull which contacts the water when the vehicle functions as a displacement water craft.

2. A vehicle as claimed in claim 1, wherein said skirting assembly is attached to the free extremites of said substantially rigid portions, and attached to the hull of said vehicle adjacent said supply ducting, whereby gaseous fluid from said supply ducting passes between said substantially rigid portions and said flexible skirting assembly to issue therefrom, characterised in that when said structures are retracted, at least part of said skirting assembly obturates the supply ducting in said hull, to prevent the ingress of water into said supply ducting, and provides an enclosed hull shape, over at least that portion of the hull which contacts the water when the vehicle functions as a displacement water craft.

3. A vehicle as claimed in claim 1, wherein the retractable structures constitute extensions of the supply ducting in said hull, characterised in that said flexible skirting assembly depends from the free ends of said structure, such that gaseous fluid from said supply ducting passes through at least part of said substantially rigid portions, and through said skirting assembly, to replenish said cushion or cushions of gaseous fluid, at least part of said retractable structures preventing the ingress of water into said supply ducts in said hull, when said structures are retracted.

4. A vehicle according to claim 1, wherein said structures include juxtaposed pivotal levers spaced along each side of the hull or hulls, and interconnected by at least one sheet of flexible fluid impermeable material.

5. A vehicle according to claim 1, wherein said structures include at least one platform which extends along at least part of the length of each side of said hull or hulls.

6. A vehicle according to claim 1, wherein said structures are pivotally connected to said hull on the side of the supply ducting remote from the gaseous cushion or cushions, and are attached to the hull on the gaseous cushion side of the supply ducting, by a sheet of flexible impermeable material, such that, when said structures are retracted upwardly, the sheet of flexible material obturates the supply ducting, to prevent the ingress of water into the supply ducting, and provides an efficient hull shape over at least that portion of the hull which contacts the water when the vehicle acts as a displacement water craft.

7. A vehicle as claimed in claim 1, wherein said structures have an upper portion, and depending therefrom, a lower portion, which is spaced apart from said upper portion, so as to form a ducting therebetween for the conveyance of gaseous fluid from the supply ducting in said hull.

8. A vehicle according to claim 7, wherein said lower portion is connected to said hull on the gaseous cushion side of the supply ducting in said hull by a flexible sheet, said flexible sheet, when the structures are retracted, preventing the ingress of water into said supply ducting over at least that portion of the hull that contacts the water, when said vehicle functions as a displacement water craft.

9. A vehicle according to claim 1, wherein at least part of said structures is accommodated in one or more recesses provided in the hull, when said structures are retracted.

10. A vehicle according to claim 1, wherein said structures are attached to the peripheral portions of the vehicle.

References Cited

UNITED STATES PATENTS

| | | | |
|---|---|---|---|
| 2,645,436 | 7/1953 | Brown | 114—67 |
| 3,275,270 | 9/1966 | Earl et al. | 180—7 |
| 3,330,240 | 7/1967 | Hardy et al. | 180—7 |

ANDREW H. FARRELL, *Primary Examiner.*